(12) United States Patent
Yu

(10) Patent No.: US 9,291,266 B2
(45) Date of Patent: Mar. 22, 2016

(54) SEALING STRUCTURE

(71) Applicant: NOK CORPORATION, Tokyo (JP)

(72) Inventor: Nan Yu, Aso (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 14/432,924

(22) PCT Filed: Feb. 1, 2013

(86) PCT No.: PCT/JP2013/052323
§ 371 (c)(1),
(2) Date: Apr. 1, 2015

(87) PCT Pub. No.: WO2014/054300
PCT Pub. Date: Apr. 10, 2014

(65) Prior Publication Data
US 2015/0233475 A1    Aug. 20, 2015

(30) Foreign Application Priority Data
Oct. 3, 2012 (JP) ................................. 2012-221509

(51) Int. Cl.
*F16J 15/02* (2006.01)
*F16J 15/06* (2006.01)
*F16J 15/10* (2006.01)

(52) U.S. Cl.
CPC .............. *F16J 15/061* (2013.01); *F16J 15/104* (2013.01)

(58) Field of Classification Search
CPC .......... F16J 15/02; F16J 15/021; F16J 15/022; F16J 15/06; F16J 15/061; F16J 15/10; F16J 15/104
See application file for complete search history.

(56) References Cited

U.S. PATENT DOCUMENTS

| 2003/0107187 | A1* | 6/2003 | Yajima et al. | 277/628 |
| 2008/0191474 | A1 | 8/2008 | Kotz | |
| 2009/0243229 | A1* | 10/2009 | Yoshida | 277/596 |
| 2011/0193298 | A1* | 8/2011 | Yoshitsune et al. | 277/648 |

FOREIGN PATENT DOCUMENTS

| JP | 60-172086 U | 11/1985 |
| JP | 63-24453 | 2/1988 |
| JP | H0842700 A | 2/1996 |
| JP | H09112699 A | 5/1997 |
| JP | H109395 A | 1/1998 |
| JP | 2008-057628 A | 3/2008 |
| JP | 2011-236996 A | 11/2011 |

* cited by examiner

*Primary Examiner* — Gilbert Lee
(74) *Attorney, Agent, or Firm* — Harness, Dickey & Pierce, P.L.C.

(57) ABSTRACT

A sealing structure includes a first member (200) having a fitting groove (220); a second member (300) fixed to the first member (200); and a gasket (100) fitted to the fitting groove (220) to seal a gap between opposing surfaces of the first member (200) and the second member (300), wherein a plurality of locking protrusions (230) are provided on one of two sidewalls of the fitting groove (220), the locking protrusions (230) being spaced from each other and arranged along the direction in which the fitting groove (220) extends, and the gasket (100) is provided with a plurality of locked protrusions (120), the locked protrusions (120) being engageably locked against the respective locking protrusions (230) from a groove bottom side of the fitting groove (220).

2 Claims, 6 Drawing Sheets

SEALING STRUCTURE

CROSS-REFERENCE TO RELATED APPLICATIONS

Figure 1:
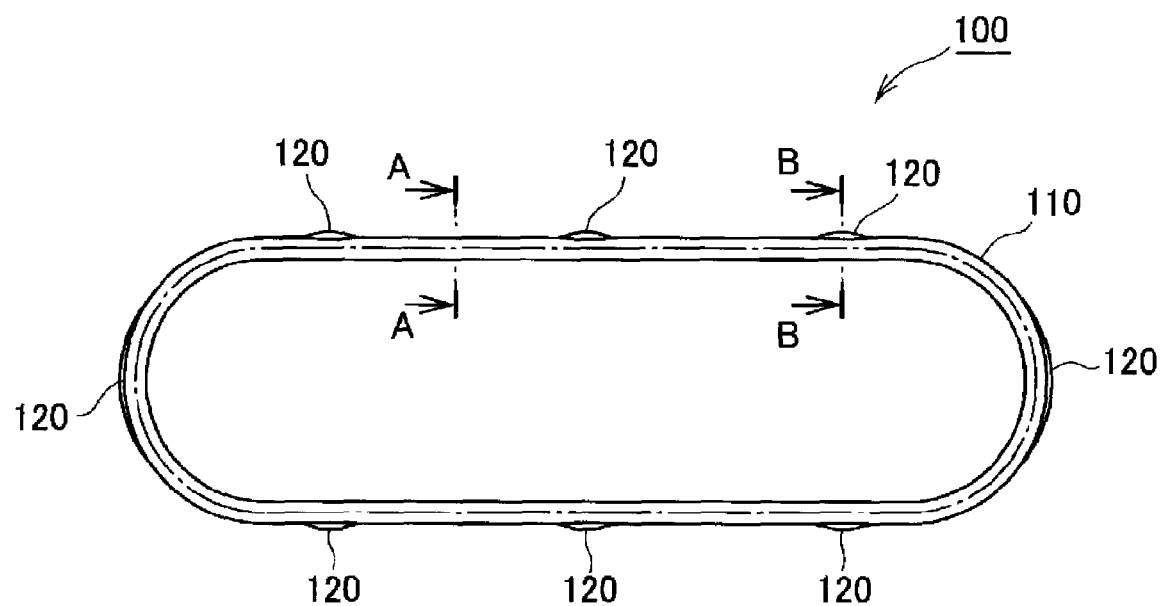

This application is a National Stage of International Application No. PCT/JP2013/052323, filed Feb. 1, 2013, which claims priority to Japanese Application No. 2012-221509, filed Oct. 3, 2012. The entire disclosures of each of the above applications are incorporated herein by reference.

FIELD

The present disclosure relates to a sealing structure including a gasket.

BACKGROUND

Conventionally, in a sealing structure including a gasket attached to a fitting groove, a structure is known in which a protrusion is provided on the gasket or the fitting groove so that the gasket is prevented from coming out of the fitting groove by utilizing elastic repulsive force generated from a portion of the gasket that is being compressed in a groove width direction (see Patent Document 1).

However, if a structure as described above is employed in a case of a gasket having a small cross sectional size, there is a possibility that such a gasket may be twisted or abnormally deformed at the time of fitting because the whole gasket tends to deform easily. Accordingly, such a gasket is difficult to fit in an appropriate position and is prone to come out easily.

CITATION LIST

Patent Literature

Patent Document 1: Japanese Patent Application Laid-Open No. 10-9395
Patent Document 2: Japanese Patent Application Laid-Open No. 2011-236996

SUMMARY

Technical Problem

An object of the present disclosure is to provide a sealing structure that is capable of stabilizing a position of a gasket while preventing the gasket from coming out, even if the gasket is one having a small cross sectional size.

Solution to Problem

The present disclosure employs the following means to achieve the above object.

That is, a sealing structure according to the present disclosure comprises: a first member having a fitting groove; a second member fixed to the first member; and a gasket fitted to the fitting groove to seal a gap between opposing surfaces of the first member and the second member, wherein a plurality of locking protrusions are provided on one of two sidewalls of the fitting groove, the locking protrusions being spaced from each other and arranged along the direction in which the fitting groove extends, and the gasket is provided with a plurality of locked protrusions, the locked protrusions being engageably locked against the respective locking protrusions from a groove bottom side of the fitting groove.

According to the present disclosure, the gasket is prevented from coming out because the locked protrusions provided on the gasket are engageably locked against the respective locking protrusions provided in the fitting groove from the groove bottom side of the fitting groove. Thus, such a structure makes it possible to better suppress an elastic deformation of the gasket as compared with a structure in which an elastic repulsive force is utilized to prevent the gasket from coming out. Therefore, even if the gasket is one having a small cross sectional size, the gasket is prevented from being twisted or abnormally deformed when it is being fitted into the fitting groove, thereby making it possible to stabilize the position of the gasket.

It is preferable that a plurality of supporting protrusions are provided on another of the two sidewalls of the fitting groove at respective positions opposing the plurality of locking protrusions, the supporting protrusions supporting respective opposite sides of portions of the gasket on which the locked protrusions are provided.

As described, by adapting a configuration in which the respective opposite sides of the portions of the gasket on which the locked protrusions are provided are being supported by the supporting protrusions, a compression of the gasket in a groove width direction occurs in limited portions thereof. Accordingly, a compression amount of the gasket will be mitigated compared with that in a case where the gasket is supported by the entire other sidewall of the fitting groove, thereby improving the attachability of the gasket and further stabilizing the position of the gasket in the fitting groove.

Advantageous Effects of the Disclosure

As described above, according to the present disclosure, it becomes possible to stabilize a position of a gasket while preventing the gasket from coming out.

DRAWINGS

Figure 2:
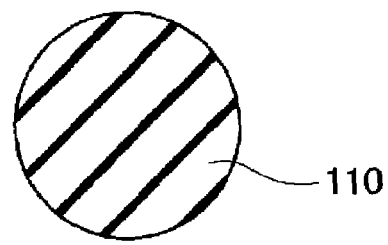
Figure 3:
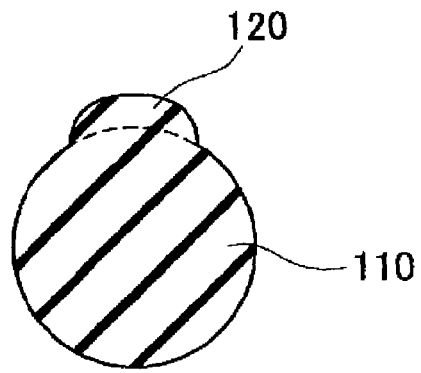
Figure 4:
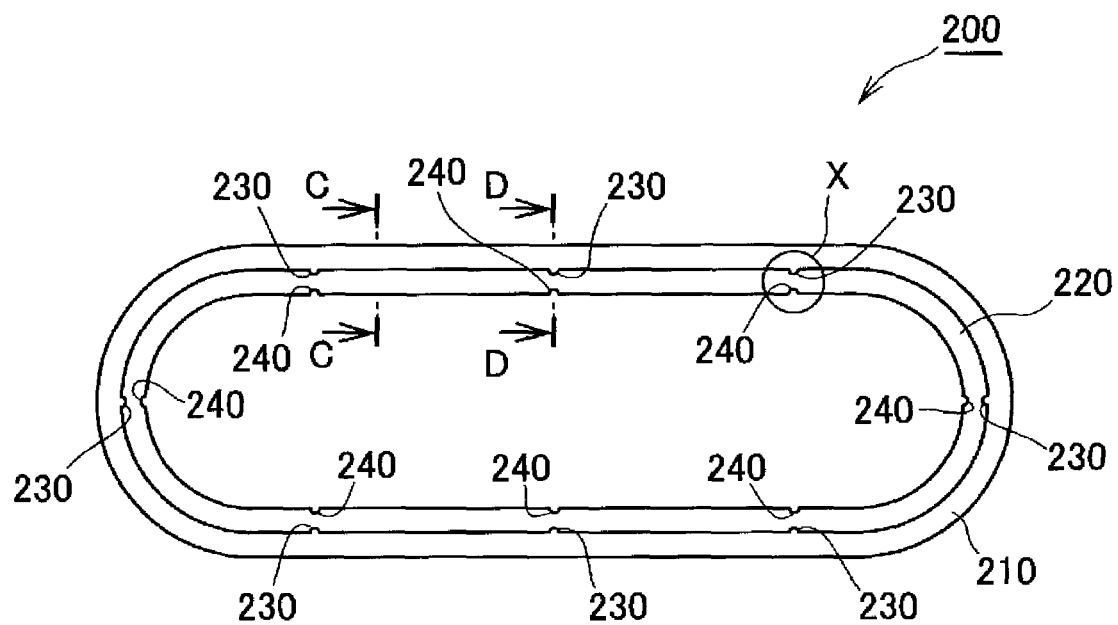
Figure 5:
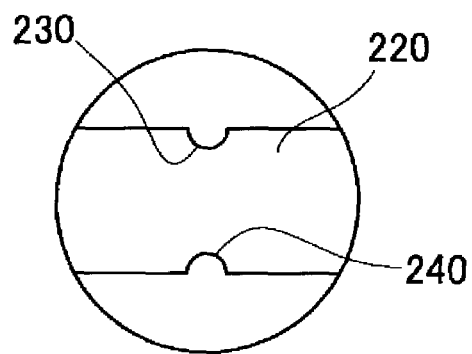
Figure 6:
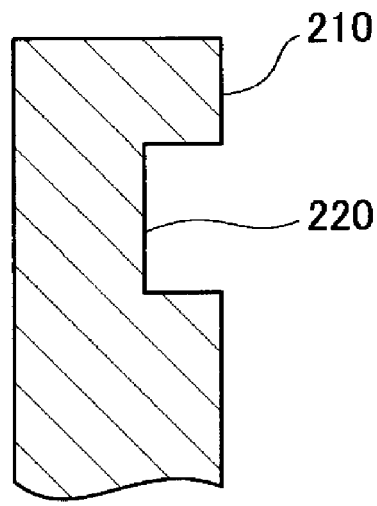
Figure 7:
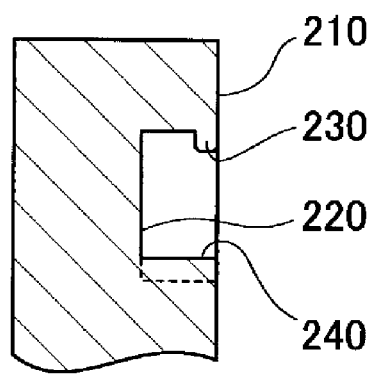
Figure 8:
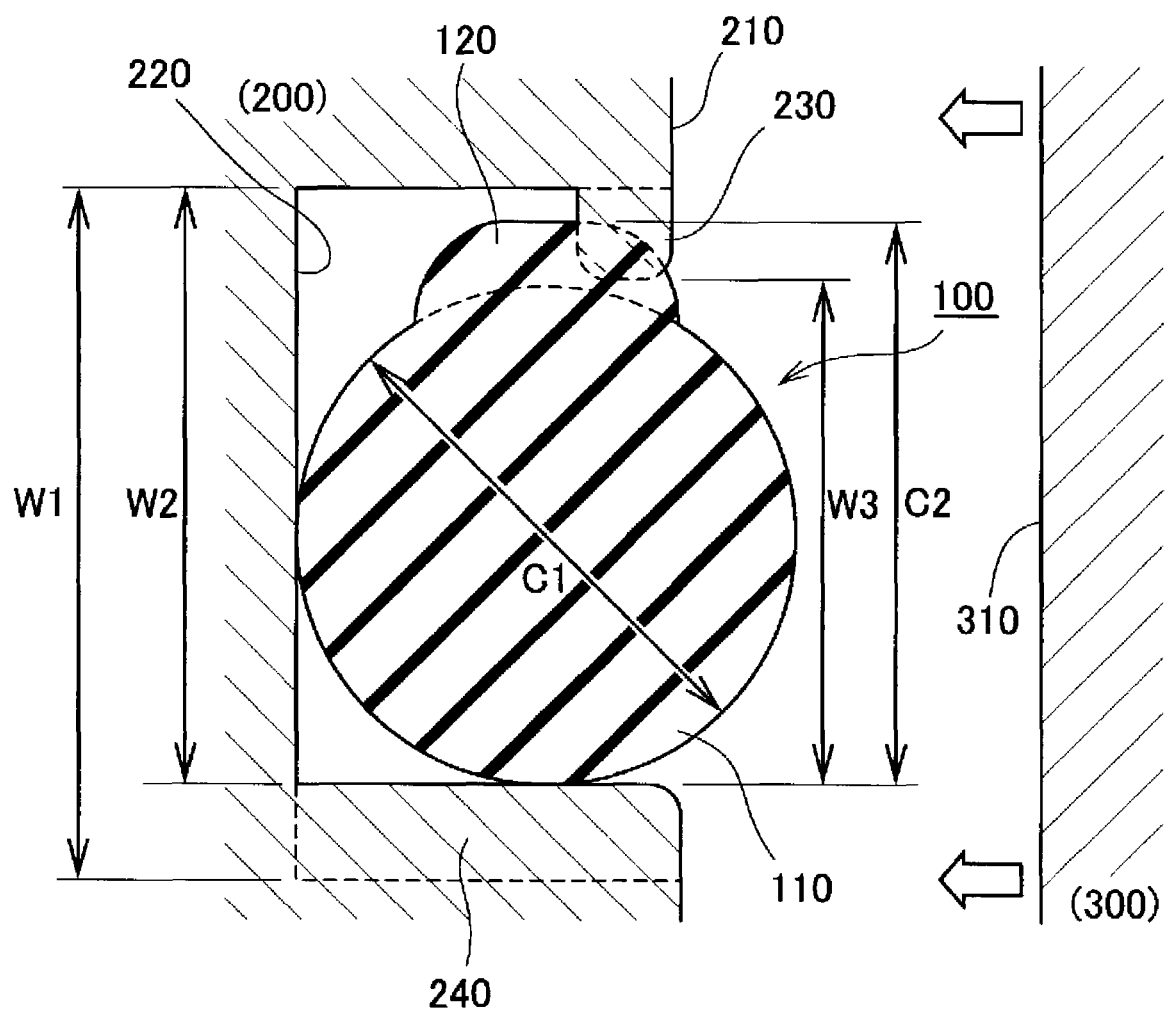
Figure 9:
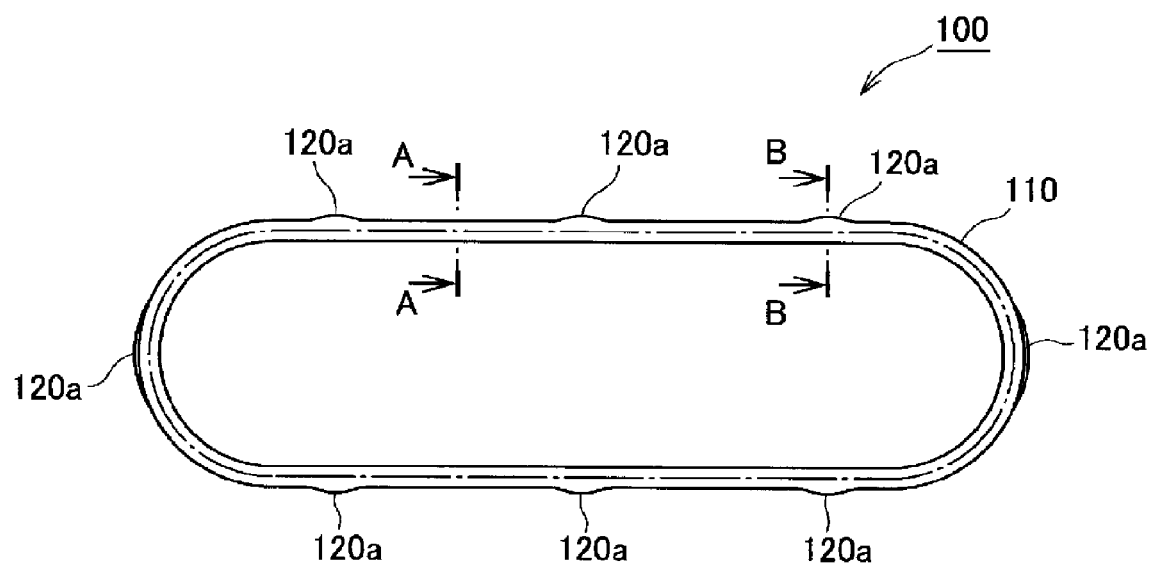
Figure 10:
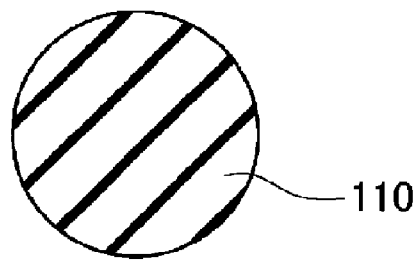
Figure 11:
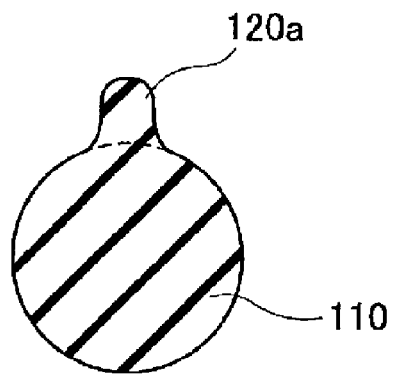
Figure 12:
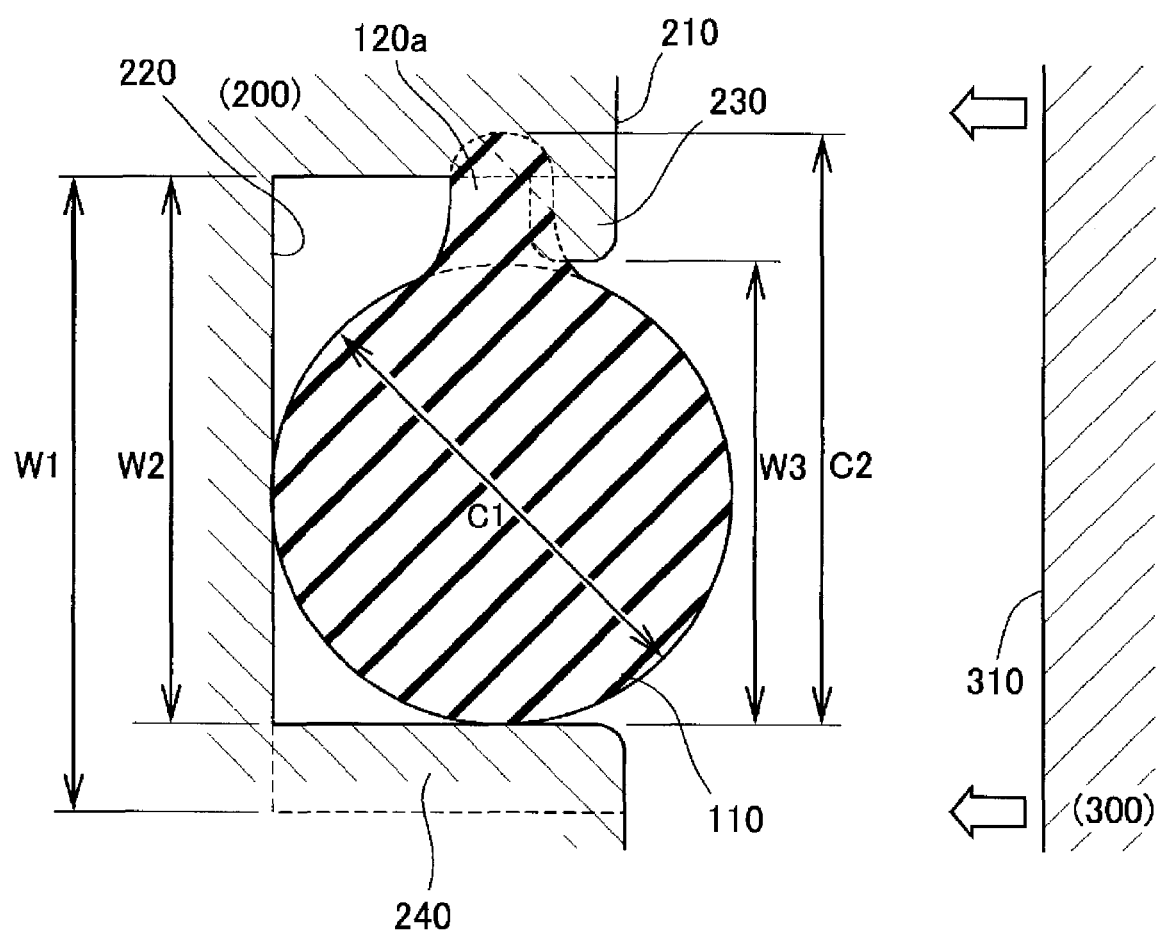

FIG. 1 is a plan view of a gasket according to a first example of the present disclosure.
FIG. 2 is a cross sectional view of the gasket according to the first example of the present disclosure.
FIG. 3 is a cross sectional view of the gasket according to the first example of the present disclosure.
FIG. 4 is a plan view illustrating a relevant portion of a first member according to an example of the present disclosure.
FIG. 5 is a partially enlarged view of FIG. 4.
FIG. 6 is a partial cross sectional view of the first member according to the example of the present disclosure.
FIG. 7 is a partial cross sectional view of the first member according to the example of the present disclosure.
FIG. 8 is a schematic cross sectional view of a sealing structure according to the first example of the present disclosure.
FIG. 9 is a plan view of a gasket according to a second example of the present disclosure.
FIG. 10 is a cross sectional view of the gasket according to the second example of the present disclosure.
FIG. 11 is a cross sectional view of the gasket according to the second example of the present disclosure.
FIG. 12 is a schematic cross sectional view of a sealing structure according to the second example of the present disclosure.

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

FIRST EXAMPLE

A sealing structure according to a first example of the present disclosure will be described with reference to FIGS. 1 to 8.

<Gasket>

A gasket according to the first example of the present disclosure will be described with reference to FIGS. 1 to 3. FIG. 1 is a plan view illustrating the whole gasket according to the first example. FIG. 2 is a cross sectional view taken along line A-A in FIG. 1. FIG. 3 is a cross sectional view taken along line B-B in FIG. 1.

A gasket 100 is made of an elastomeric material, and is constructed of a gasket body 110 and a plurality of locked protrusions 120. The gasket body 110 has an annular shape or, more specifically, a racetrack shape in the plan view. The cross sectional shape of the gasket body 110 is circular.

The locked protrusions 120 are provided on an outer peripheral side of the gasket body 110 and are spaced from each other. In the illustrated example, the locked protrusions 120 are provided at eight positions. As for the locked protrusion 120 in this example, a width of the protrusion is set to be about several times as large as its protrusion height. For example, a diameter of a circular cross-section of the gasket body 110 can be set to 1.6 mm, while a protrusion height of the locked protrusion 120 can be set to 0.2 mm and a width of protrusion at the vicinity of its base can be set to 0.8 mm.

<First Member>

A first member having a fitting groove into which the gasket 100 according to this example is to be fitted will be described with reference to FIGS. 4 to 7. FIG. 4 is a plan view of a relevant portion (a portion in which the fitting groove is provided) of the first member according to this example. FIG. 5 is an enlarged view of a portion X in FIG. 4. FIG. 6 is a cross sectional view taken along line C-C in FIG. 4. FIG. 7 is a cross sectional view taken along line D-D in FIG. 4. In FIG. 4, since the features other than the fitting groove are not relevant to the sealing structure, they are not illustrated for the sake of convenience.

A first member 200 is provided with an annular fitting groove 220. The fitting groove 220 has a racetrack shape in the plan view, as with the shape of the gasket 100 in the plan view. The first member 200 is made of a resin at least in its portion provided with the fitting groove 220.

One of two sidewalls of the fitting groove 220 (a sidewall on an outer peripheral side) is provided with a plurality of locking protrusions 230 spaced from each other and arranged along a direction in which the fitting groove 220 extends. The locking protrusions 230 are disposed close to an end face 210 of the first member 200. Thus, there is a space between the locking protrusion 230 and a groove bottom of the fitting groove 220. The locking protrusions 230 are provided at respective positions corresponding to the locked protrusions 120 provided on the gasket body 110. Thus, in the illustrated example, the locking protrusions 230 are provided at eight positions.

Another sidewall (a sidewall on an inner peripheral side) of the two sidewalls of the fitting groove 220 has a plurality of supporting protrusions 240 provided at respective positions opposing the locking protrusions 230. The supporting protrusions 240 are configured so as to extend from a groove bottom face of the fitting groove 220 to the end face 210 of the first member 200.

<Sealing Structure>

A sealing structure according to the first example of the present disclosure will be described with reference particularly to FIG. 8. FIG. 8 is a schematic cross sectional view of the sealing structure according to the first example of the present disclosure. FIG. 8 shows a state before a second member 300 is fixed to the first member 200. In order to specifically show dimensional relations between each parts, the gasket 100 is illustrated in a state in which no external force is being applied.

In a state in which the second member 300 is fixed to the first member 200, a gap is left between the opposing surfaces of these members. The gasket 100 is provided in order to seal the gap between the opposing surfaces of the first member 200 and the second member 300. Specifically, the gasket 100 is fitted to the fitting grove 220 provided on the first member 200, and in this state the second member 300 is fixed to the first member 200 in the direction indicated by the arrows in FIG. 8, whereby the gasket 100 is brought into intimate contact with the groove bottom of the fitting groove 220 and an end face of the second member 300 to seal the aforementioned gap.

In the sealing structure according to this example, as the gasket 100 is fitted to the fitting groove 220, the locked protrusions 120 provided on the gasket 100 are brought into a state in which they are engageably locked against the respective locking protrusions 230 provided on the fitting groove 220 from a groove bottom side of the fitting groove 220. In this state, each of the locked protrusions 120 is contained, with some degree of elastic deformation, in a space formed between the locking protrusion 230 and the groove bottom of the fitting groove 220. The opposite side of the gasket 100 from the side provided with the locked protrusions 120 is supported by the supporting protrusions 240 that are provided so as to oppose the respective locking protrusions 230.

Hereinafter, the dimensional relations between each parts of the sealing structure according to this example will be described. The diameter of the circular cross section of the gasket body 110 of the gasket 100 will be indicated as C1, and the distance from the tip of the locked protrusion 120 to its back side will be indicated as C2. In addition, regarding the fitting groove 220, the groove width will be indicated as W1, the distance from one sidewall of the fitting groove 220 to the tip of the supporting protrusion 240 will be indicated as W2, and the distance from the tip of the locking protrusion 230 to the tip of the supporting protrusion 240 will be indicated as W3.

Then, the sealing structure is configured so as to satisfy the following: $C1 \leq W3 < C2 < W2 < W1$.

For example, each can be set as follows: $C1=W3=1.6$ mm, $C2=1.8$ mm, $W2=1.9$ mm and $W1=2.2$ mm.

<Advantages of the Sealing Structure According to This Embodiment>

In the sealing structure according to this example, as for the gasket 100, each of the locked protrusions 120 provided on the gasket 100 is engageably locked against the respective locking protrusions 230 provided in the fitting groove 120 from the groove bottom side of the fitting groove 220. Accordingly, even before the second member 300 is fixed to the first member 200, the gasket 100 is prevented from coming out from the fitting groove 220.

In addition, in the case of the sealing structure according to this example, such a configuration is adapted in which coming-out of the gasket 100 is suppressed by engageable locking between the locking protrusions 230 and the locked protrusions 120. Thus, it becomes possible to better suppress an elastic deformation of the gasket 100 as compared with a conventional structure in which an elastic repulsive force is utilized to prevent the gasket from coming out. Therefore, even if the cross sectional size of the gasket 100 is small, the gasket 100 is prevented from being twisted or abnormally deformed when it is being fitted into the fitting groove 220. Accordingly, it becomes possible to stabilize the position of the gasket 100.

Furthermore, in the case of the sealing structure according to this example, such a configuration is adapted in which the respective opposite sides of the portions of the gasket 100 on which the locked protrusions 120 are provided are being supported by the supporting protrusions 240. Thus, the compression of the gasket 100 in the groove width direction occurs in limited portions thereof. Accordingly, the compression amount of the gasket 100 will be mitigated compared with that in a case where the gasket 100 is supported by the entire other sidewall of the fitting groove (the sidewall on the inner peripheral side), so that the repulsive force can be prevented from becoming too high. Therefore, the attachability of the gasket 100 is improved and the position of the gasket 100 in the fitting groove 220 is further stabilized.

Hereinafter advantages resulting from setting the dimensional relations of each parts as described above in the sealing structure according to this example will be described. Firstly, by setting "C1≤W3", it becomes possible to smoothly fit the gasket 100. In addition, by setting "W3<C2", the locked protrusions 120 is engageably locked against the locking protrusions 230 more securely. Furthermore, by setting "C2<W2", it becomes possible to smoothly fit the gasket 100 and to reduce the deformation amount of the gasket 100. Note that the gasket body 110 itself is hardly deformed, while the locked protrusions 120 are partly deformed due to only the locking protrusions 230. In other words, in this example, the locked protrusions 120 are engageably locked against the locking protrusions 230 from the groove bottom side, while only portions thereof are partially deformed. Therefore, the gasket 100 is being positioned in the fitting groove 220, as well as being prevented from coming out therefrom.

SECOND EXAMPLE

FIGS. 9 to 12 show a second example of the present disclosure. In this example, such a configuration is exemplified in which the shape of the locked protrusion of the gasket is different from that in the above-described first example. Since other features and their functions are the same as those of the first example, the same constituent components will be denoted by the same reference signs and description thereof will be omitted.

<Gasket>

A gasket according to the second example of the present disclosure will be described with reference to FIGS. 9 to 11. FIG. 9 is a plan view illustrating the whole gasket according to the second example of the present disclosure. FIG. 10 is a cross sectional view taken along line A-A in FIG. 9. FIG. 11 is a cross sectional view taken along line B-B in FIG. 9.

A gasket 100 is made of an elastomeric material, and is constructed of a gasket body 110 and a plurality of locked protrusions 120a. The gasket body 110 has an annular shape or, more specifically, a racetrack shape in the plan view. The cross sectional shape of the gasket body 110 is circular.

The locked protrusions 120a are provided on an outer peripheral side of the gasket body 110 and are spaced from each other. In the illustrated example, the locked protrusions 120a are provided at eight positions. The locked protrusion 120a in this example has a protrusion height larger than that in the above-described first example and has a thin fin-like shape. For example, a diameter of a circular cross-section of the gasket body 110 can be set to 1.6 mm, while a protrusion height of the locked protrusion 120a can be set to 0.45 mm and a width of protrusion at the vicinity of its center can be set to 0.3 mm.

The configuration of the first member 200 is the same as that described above in the first example, hence its description is omitted.

<Sealing Structure>

The sealing structure according to the second example of the present disclosure will be described with reference particularly to FIG. 12. FIG. 12 is a schematic cross sectional view of the sealing structure according to the second example of the present disclosure. FIG. 12 shows a state before the second member 300 is fixed to the first member 200. In order to specifically show dimensional relations between each parts, the gasket 100 is illustrated in the state in which no external force is being applied.

The gasket 100 is provided in order to seal the gap between the opposing surfaces of the first member 200 and the second member 300, as described above in the description of the first example.

Also in the sealing structure according to this example, as the gasket 100 is fitted to the fitting groove 220, the locked protrusions 120a provided on the gasket 100 are brought into a state in which they are engageably locked against the respective locking protrusions 230 provided on the fitting groove 220 from the groove bottom side of the fitting groove 220. In this state, each of the locked protrusions 120a is contained, with some degree of elastic deformation, in the space formed between the locking protrusion 230 and the groove bottom of the fitting groove 220. The opposite side of the gasket 100a from the side provided with the locked protrusions 120 is supported by the supporting protrusions 240 provided so as to oppose the respective locking protrusions 230.

Hereinafter, the dimensional relations between each parts of the sealing structure according to this example will be described. The diameter of the circular cross section of the gasket body 110 of the gasket 100 will be indicated as C1, and the distance from the tip of the locked protrusion 120a to its back side will be indicated as C2. In addition, regarding the fitting groove 220, the groove width will be indicated as W1, the distance from one sidewall of the fitting groove 220 to the tip of the supporting protrusion 240 will be indicated as W2, and the distance from the tip of the locking protrusion 230 to the tip of the supporting protrusion 240 will be indicated as W3.

Then, the sealing structure is configured so as to satisfy the following: C1≤W3<W2<C2<W1.

For example, each can be set as follows: C1=W3=1.6 mm, W2=1.9 mm, C2=2.05 mm and W1=2.2 mm.

In the sealing structure configured as described above, the same advantageous effects as those of the sealing structure according to the above-described first example can also be obtained.

In the first example, the relation "C2<W2" is presented, whereas in this example, the relation "W2<C2" is presented. However, since the locked protrusion 120a provided on the gasket 100 according to this example has a thin fin-like shape, the gasket body 110 itself is hardly deformed, whereas the locked protrusion 120a is partially deformed due to the locking protrusion 230 and one of the sidewalls of the fitting groove 220.

(Others)

In the above-described first and second examples, such a configuration is described in which, in order to reduce the compression amount of the gasket 100, the opposite sides of the portions of the gasket 100 on which the locked protrusions 120 or 120a are provided are being supported by the supporting protrusions 240. However, in cases where it is not necessary to reduce the compression amount of the gasket 100, such a configuration in which the gasket 100 is supported by the whole of the other of the sidewalls (the sidewall on the inner peripheral side) of the fitting groove 220 may be employed. In this case, the supporting protrusions 240 may be excluded from the configurations shown in FIGS. 8 and 12, and the groove width may be set to W2.

No particular limitations are placed on gaskets to which the present disclosure may be applied, yet the present disclosure is particularly advantageous when applied to gaskets having small cross sectional sizes (e.g. those with a gasket body of 2 mm or less in diameter).

REFERENCE SIGNS LIST

100: gasket
110: gasket body
120, 120a: locked protrusion
200: first member
210: end face
220: fitting groove
230: locking protrusion
240: supporting protrusion
300: second member

The invention claimed is:

1. A sealing structure comprising:
a first member having a fitting groove;
a second member fixed to the first member; and
a gasket fitted to the fitting groove to seal a gap between opposing surfaces of the first member and the second member, wherein
a plurality of locking protrusions are provided on one of two sidewalls of the fitting groove, the locking protrusions being spaced from each other and arranged along the direction in which the fitting groove extends,
the gasket is provided with a plurality of locked protrusions, the locked protrusions being engageably locked against the respective locking protrusions from a groove bottom side of the fitting groove,
a plurality of supporting protrusions are provided on another of the two sidewalls of the fitting groove at respective positions opposing the plurality of locking protrusions, the supporting protrusions supporting respective opposite sides of portions of the gasket on which the locked protrusions are provided, and
a distance from the one of two sidewalls to a tip of the supporting protrusion on the fitting groove is set to be longer than a distance from a tip of the locked protrusion to a back side thereof on the gasket.

2. The sealing structure according to claim 1, wherein the plurality of supporting protrusions are located and configured to compress the gasket against the locking protrusions when the gasket is fully inserted into the fitting groove.

* * * * *